March 26, 1963 J. P. SIMINI 3,082,948
TRIGONOMETRIC CALCULATOR

Filed July 15, 1960 6 Sheets-Sheet 1

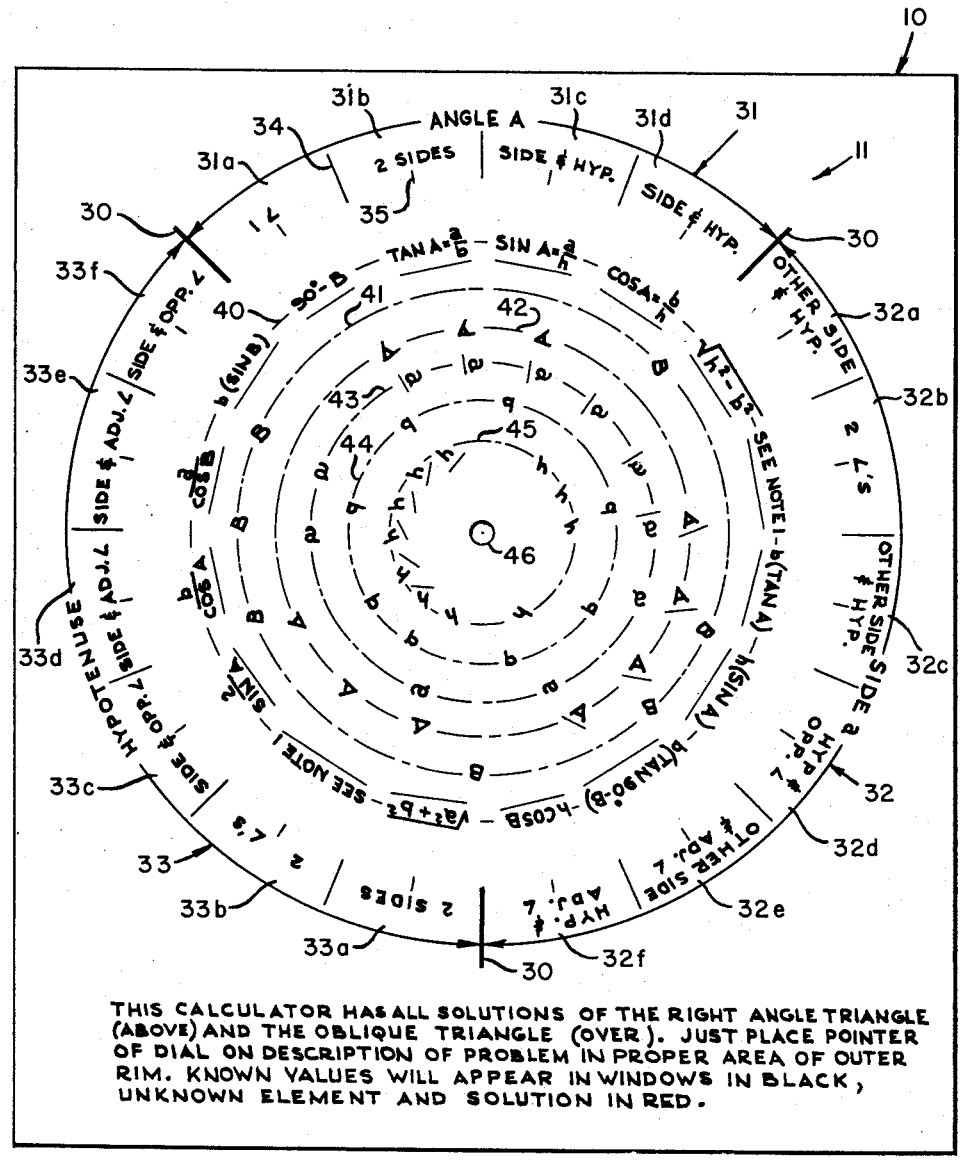

THIS CALCULATOR HAS ALL SOLUTIONS OF THE RIGHT ANGLE TRIANGLE (ABOVE) AND THE OBLIQUE TRIANGLE (OVER). JUST PLACE POINTER OF DIAL ON DESCRIPTION OF PROBLEM IN PROPER AREA OF OUTER RIM. KNOWN VALUES WILL APPEAR IN WINDOWS IN BLACK, UNKNOWN ELEMENT AND SOLUTION IN RED.

FIG-1

*INVENTOR.*
JOSEPH P. SIMINI
BY
*Edward B. Gregg*
ATTORNEY

March 26, 1963

J. P. SIMINI 3,082,948

TRIGONOMETRIC CALCULATOR

Filed July 15, 1960

INVENTOR.
JOSEPH P. SIMINI
BY
*Edward B. Tegg*
ATTORNEY

March 26, 1963     J. P. SIMINI     3,082,948
TRIGONOMETRIC CALCULATOR
Filed July 15, 1960     6 Sheets-Sheet 4
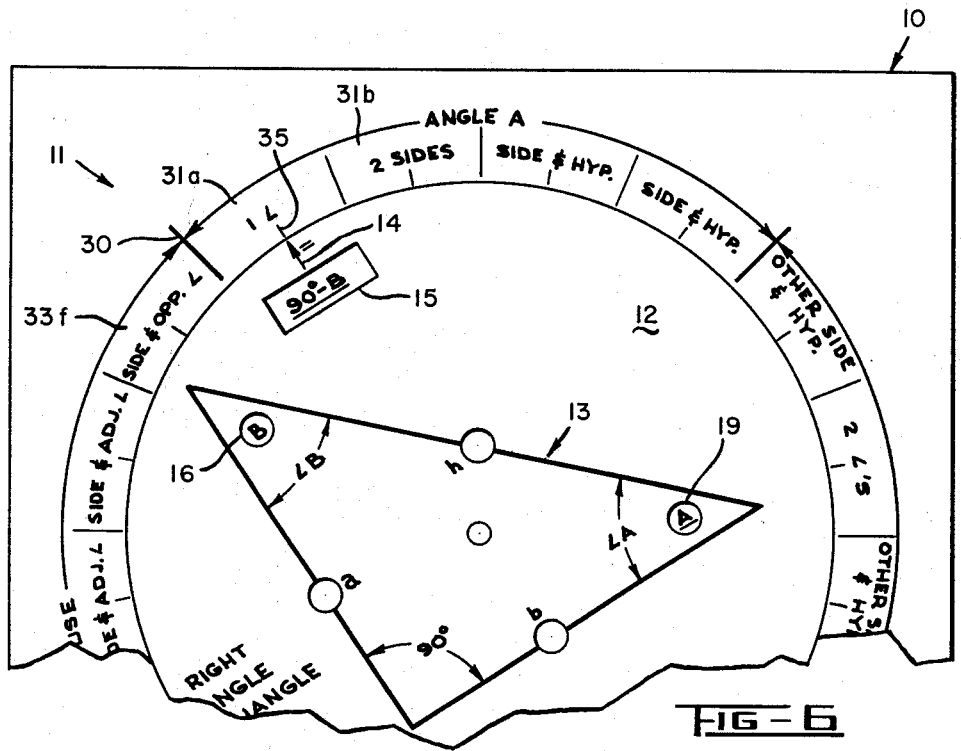
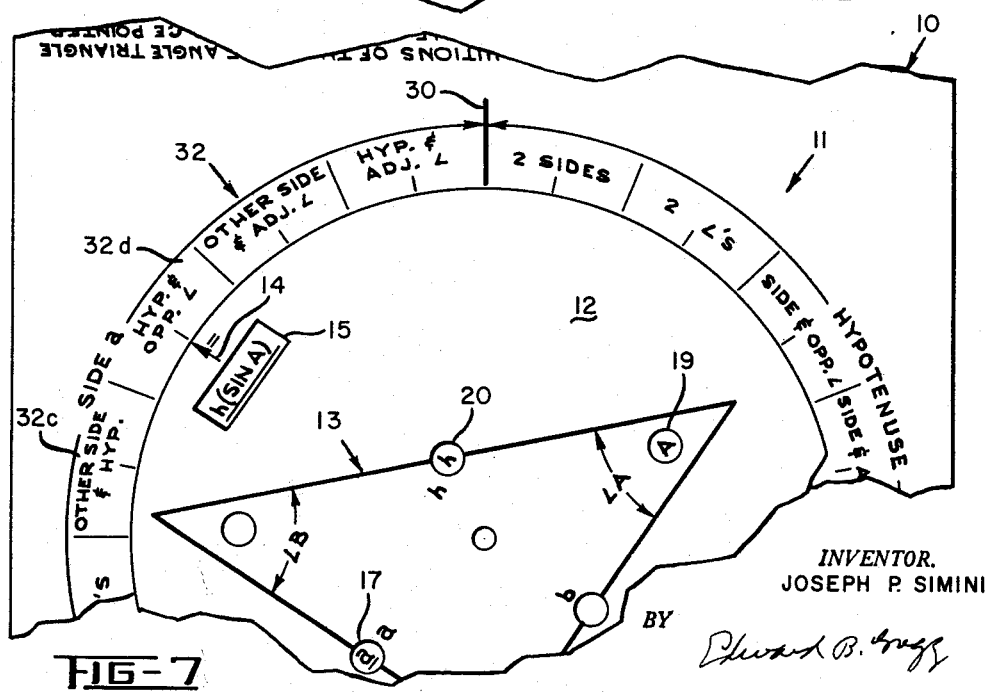
INVENTOR.
JOSEPH P. SIMINI
BY
*Edward B. Gregg*
ATTORNEY March 26, 1963  J. P. SIMINI  3,082,948
TRIGONOMETRIC CALCULATOR
Filed July 15, 1960  6 Sheets-Sheet 5

*INVENTOR.*
JOSEPH P. SIMINI
BY Edward B. Gregg
ATTORNEY

March 26, 1963 — J. P. SIMINI — 3,082,948
TRIGONOMETRIC CALCULATOR
Filed July 15, 1960 — 6 Sheets-Sheet 6

INVENTOR.
JOSEPH P. SIMINI
BY
ATTORNEY

United States Patent Office 3,082,948
Patented Mar. 26, 1963

3,082,948
TRIGONOMETRIC CALCULATOR
Joseph Peter Simini, 21 Sutro Heights Ave.,
San Francisco, Calif.
Filed July 15, 1960, Ser. No. 43,069
7 Claims. (Cl. 235—88)

This invention relates to a trigonometric calculator.

A need exists for an instrument which is capable of solving trigonometric problems and which is characterized by compactness, low manufacturing cost, ease of manipulation and easy readability.

In accordance with my invention I provide such an instrument by providing a base and a rotary member or calculator, both of which are flat members constructed of paper, plastic or other suitable material upon which are printed trigonometric symbols and functions, the rotary member being formed with ports or holes for exposing known and unknown quantities printed on the base.

One form of my invention is illustrated by way of example in the accompanying drawings, in which:

FIGURE 1 is a plan view of one side of the base or body portion of my instrument.

FIGURES 6 and 7 are views of the complete device showing the rotary calculator of FIGURE 2 attached to the base of FIGURE 1. in FIGURE 6 the rotary calculator is shown in a position to solve a particular problem. In FIGURE 7 the rotary calculator is shown in a different position to solve another problem.

FIGURE 8 shows the solution of a particular problem and FIGURE 9 shows the solution of another problem.

Figure 3:
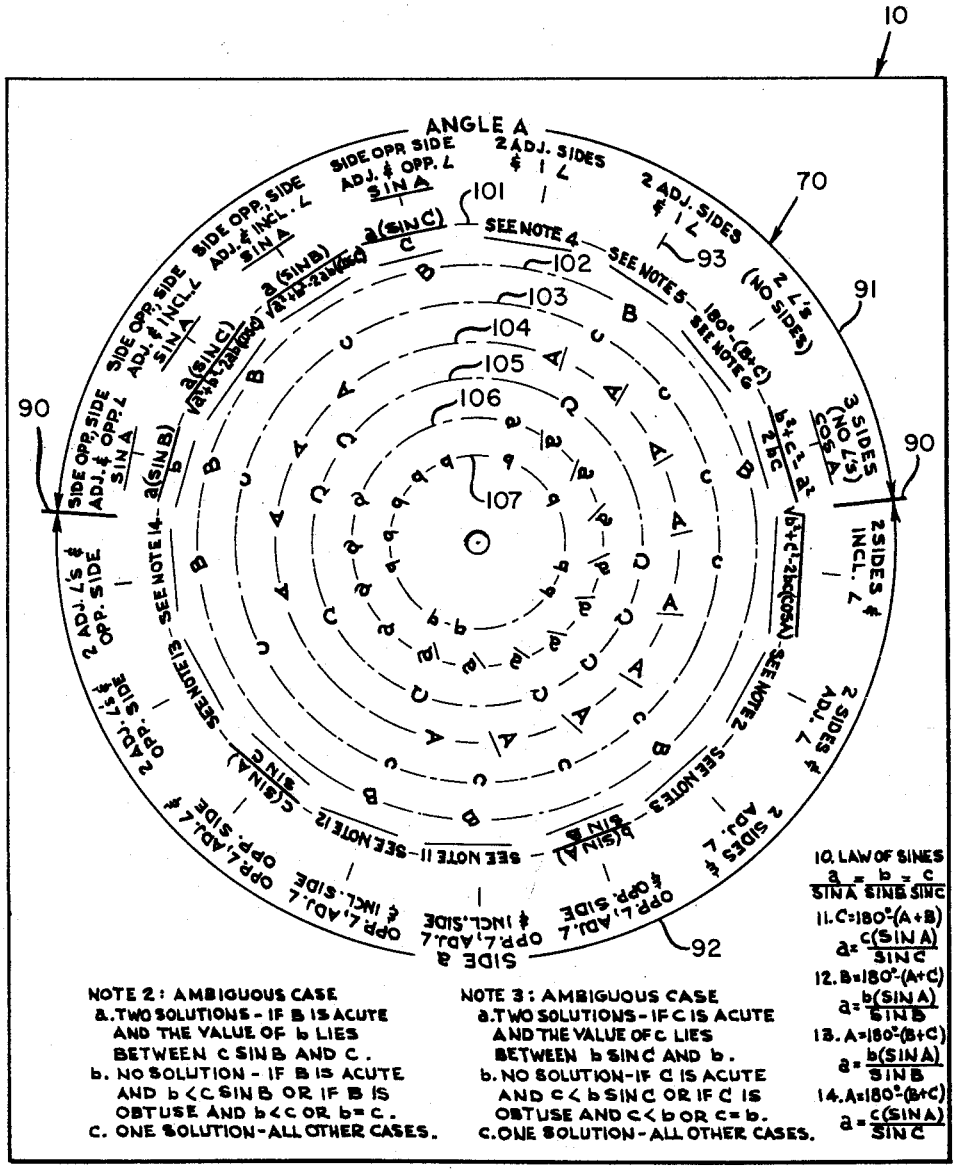
FIGURE 3 is a plan view similar to that shown in FIGURE 1 but of the reverse side of the base.

Referring now to FIGURE 1, the reference numeral 10 indicates a flat base or body which is printed on both sides with indicia, the opposite side being shown in FIGURE 3. The base 10 may be constructed of paper, cardboard, wood, plastic, metal, glass or any other suitable material.

Figure 5:
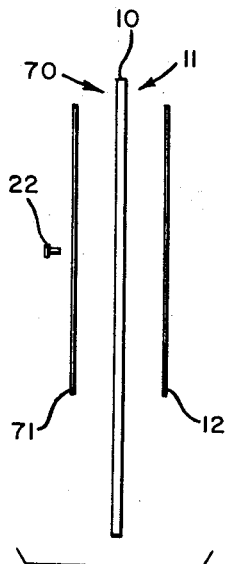
FIGURE 5 is an exploded view showing how the base of FIGURES 1 and 3 and the rotary calculators of FIGURES 2 and 4 are assembled.
Figure 2:
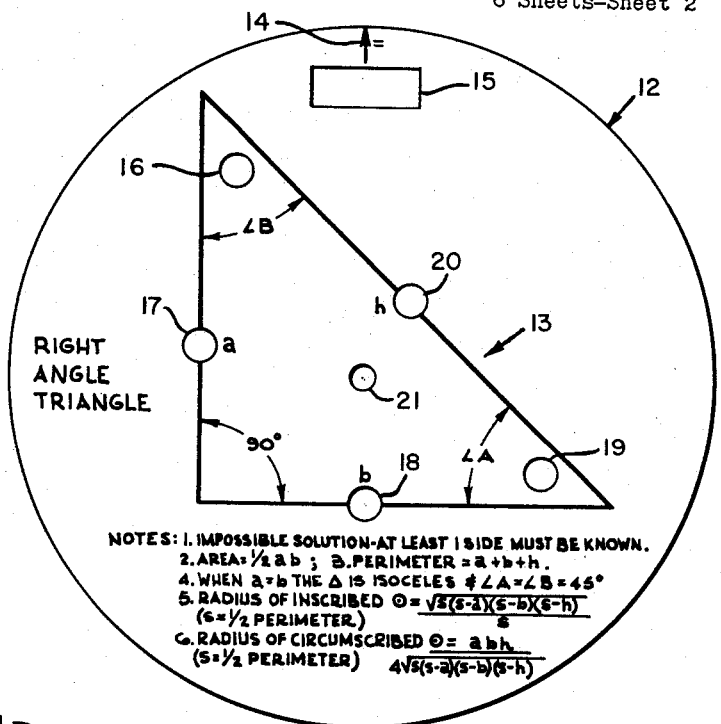
FIGURE 2 is a similar view of the rotary portion or calculator associated with the base shown in FIGURE 1.

On the side shown in FIGURE 1 the base 10 is printed with a circle 11. On and within this circle are printed indicia as described hereinafter. The circle 11 and its components cooperate with a rotary calculator 12 which is shown in FIGURE 2. The rotary calculator 12 is a flat member constructed of any suitable material, e.g., paper, cardboard, wood, plastic, metal, glass or the like. Upon the rotary calculator 12 is printed a right triangle generally designated by the reference numeral 13. Upon this right triangle are printed, according to conventional usage, the letters A and B to indicate the acute angles A and B, the letters $a$ and $b$ to indicate the corresponding opposite sides, and the letter $h$ to indicate the hypotenuse. It will be understood that acute angles A and B may have any values whose sum is 90°. A sighting arrow or pointer is printed at 14 on the edge of the calculator 12. Immediately beneath this sighting arrow is a rectangular sighting hole 15. Other sighting holes are formed at 16, 17, 18, 19 and 20. A central hole is formed at 21 to receive a connector member or pivot such as shown at 22 in FIGURE 5 by which the calculator 12 is rotatably and concentrically connected to the circle 11 on body 10. As will be seen from FIGURES 6 and 7, and as explained in detail hereinafter, the sighting holes 15 to 20 are intended to register with groups or sets of indicia within the circle 11.

Reverting to FIGURE 1, the circle 11 is divided by radial line segments 30 into sectors 31, 32 and 33. Sector 31 relates to the angle A; sector 32 relates to the side $a$; and sector 33 relates to the hypotenuse $h$. Each sector is marked appropriately; i.e., sector 31 by the word angle A, etc. Each of the sectors 31, 32 and 33 is divided by radial line segments 34 into segments or subsectors 31$a$, 31$b$ etc.; 32$a$, 32$b$ etc.; and 33$a$, 33$b$ etc., respectively. A sighting mark 35 is printed midway between the boundary lines in each subsector 31$a$, etc., 32$a$, etc. and 33$a$, etc. Within each of the subsectors thus marked off are printed certain trigonometric indicia. For example, in the subsector 31$a$ is printed the indicia "1∠," which signifies the angle A appearing on the rotary calculator 12; in subsector 31$b$ is printed the indicia "2 sides," which signifies the two sides $a$ and $b$ of the right triangle 13, etc. The indicia in each subsector are the elements of a particular problem which are known.

For convenience instructions are printed on the base 10 beneath the circle 11 and certain notes relating to the properties of right triangles are printed on the rotary calculator 12 beneath the right triangle 13.

Concentric circles 40, 41, 42, 43, 44 and 45 are shown in broken lines within the large circle 11. In practice, these inner circles need not be used. They are shown in the drawings herein to aid in description of the device and its mode of operation and to explain the geometric relation of the symbols and indicia appearing within the circle 11. As a further aid to understanding, certain of the indicia and symbols are underscored or superscored. In practice those indicia and symbols which are underscored or superscored may be, and preferably are, printed in a distinctive color, for example, red while the remaining indicia and symbols, including those in the subsectors 31$a$, 32$a$, and 33$a$, etc. are printed in another distinctive color, for example, black. Hereinafter this convention will be observed. That is, symbols and indicia which are underscored or superscored will be referred to as "red" and all others will be referred to as "black."

It will be seen that certain trigonometric functions and formulae are printed on the circle 40 and that all of them are red; that the upper case letter B (signifying the angle B of the right triangle 13) on the next inner circle 41, is black; that the upper case letter A (signifying the other acute angle A of the right triangle 13) is printed on the next circle 42 and that some of the A's are black while the others are red; that the lower case letter $a$ (signifying side $a$ of the right triangle 13) is printed on the next circle 43, some of the $a$'s being red and others being black; that the lower case letter $b$ (signifying the side $b$ of the right triangle 13) is printed in black on the next circle 44; and that on the innermost circle 45 is printed the lower case letter $h$ (signifying the hypotenuse of the right triangle 13), some being in red and others in black. At the center is a mounting hole 46 for reception of the pivot member 22.

In use the calculator 12 is, of course, mounted on the body 10 concentrically to the circle 11. The black letters on circles 41, 42, 43, 44 and 45 represent known quantities and the red letters represent unknown quantities. The red functions or formulae on the circle 40 represent the solutions or answers. For example, to take perhaps the simplest problem, if the acute angle B of a right triangle is known and it is desired to calculate the value of the other acute angle A, the calculator 12 is rotated until its indicator arrow 14 registers with the sighting line 35 of the segment 31a. In this position, as shown in FIGURE 6, the sighting opening 16 registers with a black B on circle 41 and the sighting opening 19 registers with a red A on circle 42. This indicates that angle B is known and that the value of angle A is sought. The solution appears through sighting opening 15 which reveals the answer, namely, 90°–B. The calculator 12 masks all other indicia on the circles 40 to 45 so that even an unskilled person can set up the problem and read the answer quickly and accurately.

The problem described, of course, is very simple but will serve to illustrate the advantages of the device, which is equally capable of solving more difficult problems. For example, if the length of hypotenuse $h$ and the value of angle A are known, and if it is desired to calculate the length of opposite side $a$, the rotary calculator 12 is rotated to the position shown in FIGURE 7 where the known quantities appear in black through sighting holes 19 (angle A) and 20 (hypotenuse $h$), the unknown quantity $a$ appears in red through sighting hole 17 and the answer, which is $h(\sin A)$, appears through sighting hole 15.

This easy, efficient and dependable operation results in part from the fact that the sighting holes 15, 16, 17, 18, 19 and 20 are located at radial distances from the center 21 so that hole 15 moves on circle 40, hole 16 on circle 41, hole 19 on circle 42, hole 17 on circle 43, hole 18 on circle 44 and hole 20 on circle 45. Also it will be noted that each of the several letters B, A, $a$, $b$ and $h$ are grouped unsymmetrically about their common center. This grouping is arranged to bring about proper registry of the known (black) and unknown (red) quantities with the corresponding quantities in the subsectors 31a, 31b, etc. and with the corresponding answers on circle 40.

Figure 4:
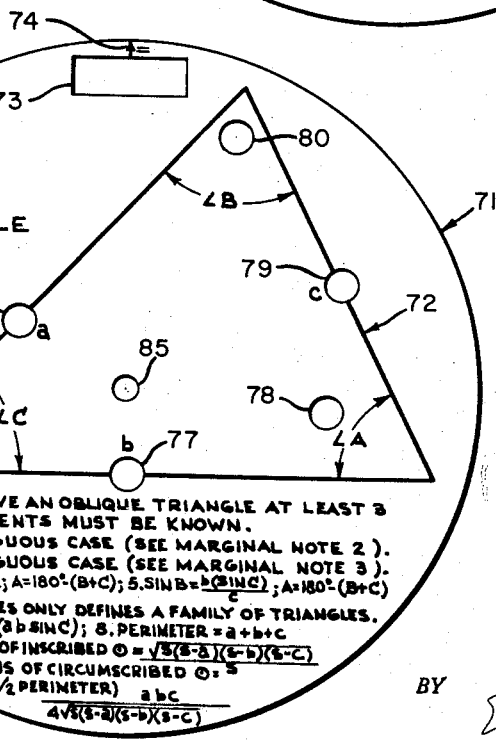
FIGURE 4 is a view similar to that shown in FIGURE 2 but it shows the rotary calculator employed with the reverse side of the base shown in FIGURE 3.

Referring now to FIGURES 3 and 4, the reverse side of the body member 10 is shown in FIGURE 3 and another rotary calculator is shown in FIGURE 4. In the preferred form of the invention, as will be apparent, both sides of a flat body member 10 are employed so that space is conserved and the capacity of a device of given diameter is doubled. However, it will be apparent two separate devices may be employed, i.e., two bases and two rotary calculators.

A circle 70 is printed on the body member 10 and a rotary calculator 71 is provided which is rotatably and concentrically mounted on the body member 10 as by means of the above-mentioned pivot member 22.

Referring to FIGURE 4 an oblique triangle 72 is printed on the calculator 71. It has angles A, B and C and corresponding opposite sides $a$, $b$ and $c$. Adjacent its edge the calculator 71 is provided with a rectangular sighting hole 73 and a pointer 74 is printed on the calculator in registry with the sighting hole 73. Other sighting holes are formed along the edges or within the body of the oblique triangle 72, such sighting holes being indicated by the reference numerals 75, 76, 77, 78, 79 and 80. A mounting hole is formed at 85 to receive the pivot member 22. Also printed on the calculator 71 beneath the triangle 72 are pertinent notes and formulae.

Referring again to FIGURE 3, the circle 70 is divided by radial line segments 90 into two sectors 91 and 92. The sector 91 relates to the angle A of oblique triangle 72 on calculator 71 and the sector 92 relates to the opposite side (side $a$) of the same triangle.

It will be understood, of course, that angle A represents any angle of an oblique triangle and that side $a$ represents any side so that any angle and any side can be calculated provided the necessary known quantities are available.

Sighting lines 93 are provided in the form of small radial segments each in registry with certain indicia printed along the margin of the circle 70.

As in the case of the circle 11 in FIGURE 1 the sets of known quantities appear in a distinctive color (for example, black) adjacent the margin of the circle 70; individual known quantities appear in a similar color along the circles 102 to 107; the individual unknown quantities appear on certain of these inner circles in a distinctive color (e.g., red); and the answers appear in the same distinctive color (red) on circle 101. For convenience, and to conserve space while printing the answers in easily legible type, the symbols sin A and cos A are printed in red radially outwardly in certain locations.

Figure 8:
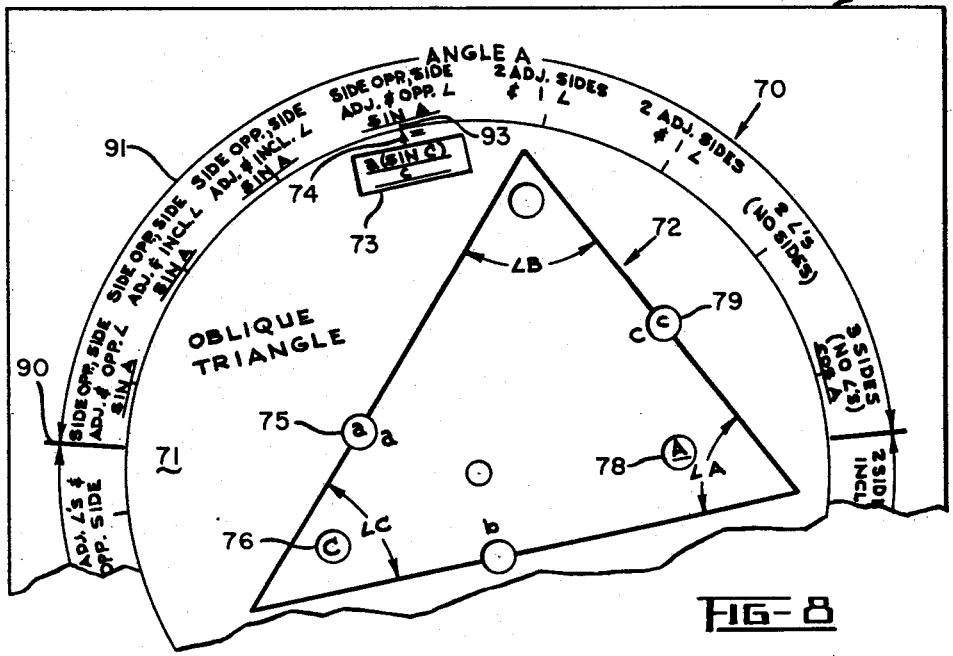
FIGURES 8 and 9 are views of the rotary calculator of FIGURE 4 and the base of FIGURE 3 in assembled, operating relationship.

In use the device illustrated in FIGURES 3 and 4 is manipulated as follows: As in the case of the calculator 12 shown in FIGURES 1, 2, 6 and 7, the calculator 71 is rotated to bring its pointer 74 into registry with the set of known quantities for the selected problem. For example, if sides $a$ and $c$ of triangle 72 are known and also angle C, the calculator 72 is rotated to the position shown in FIGURE 8 in which the arrow 74 is in registry with the sighting line 93 just below the marginal words "side opp., side adj. and opposite ∠" which appear near the top of circle 70. The sighting holes 75 and 79 reveal the sides $a$ and $c$ and the sighting hole 76 reveals the angle C in black. These are the known quantities. The unknown angle A appears in sighting hole 78 in red. The answer appears in sighting hole 73 and just above it, in red. The answer is $$\sin A = \frac{a (\sin C)}{c}$$

Figure 9:
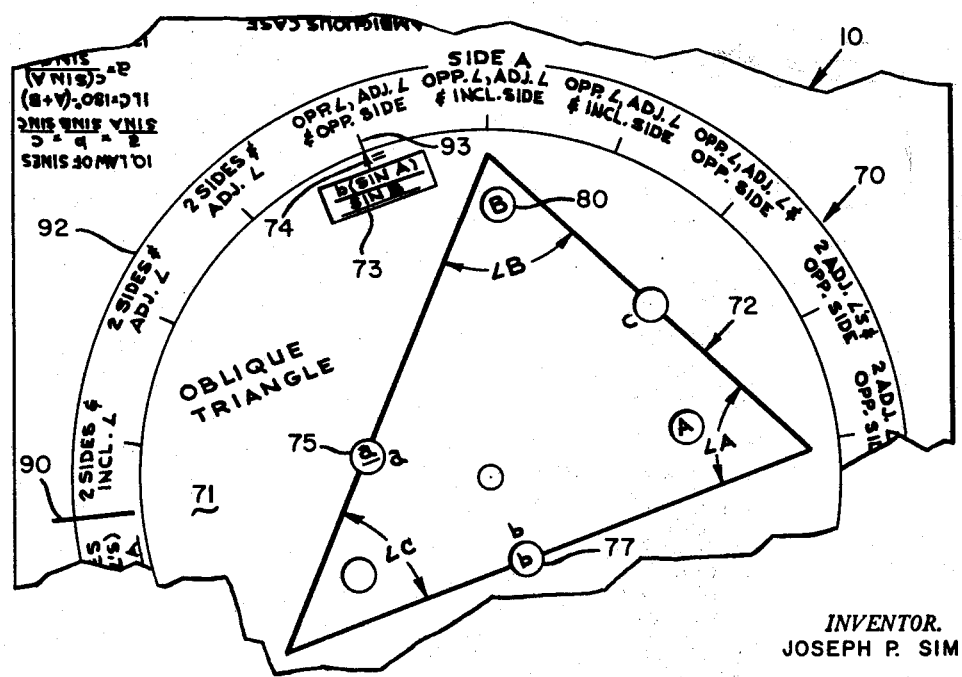

Similarly if two angles A and B and an adjacent side $b$ are known and it is desired to calculate side $a$ the calculator 71 is rotated to the position shown in FIGURE 9. The answer will appear through the sighting hole 73 as $$\frac{b (\sin A)}{\sin B}$$

Figure 10:
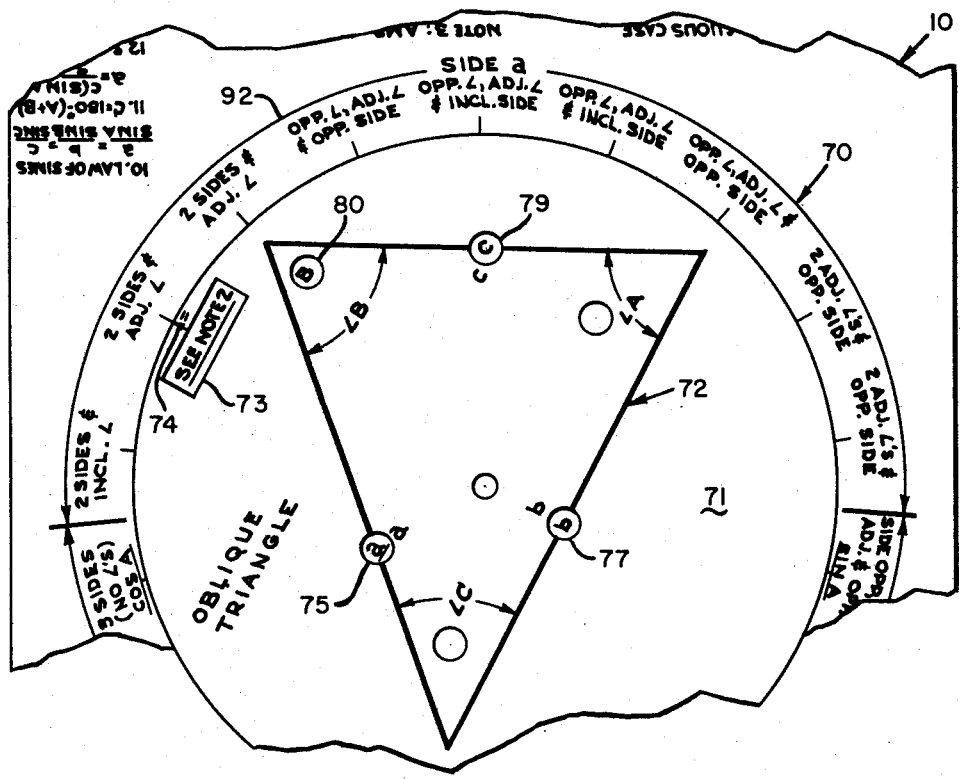
FIGURE 10 is another view similar to FIGURES 8 and 9 but showing a problem different than those shown in FIGURES 8 and 9.

At intervals along the circle 101 are references to notes, for example, "See note 3." In most instances these relate to ambiguous cases or impossible solutions. For example in FIGURE 10, the calculator 71 has been rotated to a position in which the indicator arrow 74 selects and designates as the set of known quantities two sides and an adjacent angle. The known sides $b$ and $c$ and the known angle B adjacent one side appear in black as known quantities through sighting holes 77, 79 and 80, respectively; and the unknown side $a$ appears in red through sighting hole 75. Looking at sighting hole 73, it reveals the notation, "see Note 2." Reference to Note 2 on the rotary calculator 71 cites this as an ambiguous case and refers to "Marginal Note 2." Marginal Note 2 appears at the bottom of base 10 in FIGURE 3 and it gives the various solutions. There are two solutions if B is acute and the value of $b$ lies between $c \sin B$ and $c$. There is no solution if B is acute and $b$ is less than $c \sin B$, or if B is obtuse and $b$ is less than $c$ or is equal to $c$. There is one solution in all other cases.

It will, therefore, be apparent that a compact, easily operated trigonometric calculator has been provided.

I claim:

1. A calculator of the character described comprising a base and a rotary member mounted to rotate on the base, said rotary member covering a portion of the base and leaving uncovered a marginal portion outside the perimeter of the rotary member; said marginal portion of the base being divided into large segments and each large segment bearing indicia which indicate a particular unknown element of trigonometric or geometric problems, each said large segment being further divided into small segments each bearing indicia representative of known elements of a trigonometric or geometric problem, all said large and small segments being visible in any position of said rotary member; the covered portion of said base bearing answers to said problems; said rotary member having a first sighting means for alignment with any selected small marginal segment and with the indicia thereon, said rotary member being also formed with a second sighting means in the form of an aperture for revealing the answer on the covered portion of the base corresponding to the selected problem.

2. A trigonometric calculator of the character described comprising a base and a rotary member mounted to rotate on the base and to cover the central portion of the base while leaving the marginal portion of the base uncovered; said base being printed on its marginal portion with indicia indicating various trigonometric problems; said base being printed on its central portion with (1) the individual known elements of said problems in a distinctive color, (2) the unknown elements of said problem in another distinctive color and (3) the answers to said problems; said answers being located on a circle and said known and unknown elements being located on a plurality of circles, indicia representative of each angle or side problem element being on a separate circle, all of said circles being concentric to the rotary axis of the rotary member; said rotary member being formed with a first sighting means for alignment with any selected marginal problems, with a second sighting means in the form of an answer aperture rotating on the answer circle and with additional sighting means in the form of element apertures rotating on the circles bearing said elements, each said element aperture corresponding to a side or an angle of a triangle, said apertures permitting exposure of printed matter on the central portion of the base; said apertures, first sighting means and printed matter being so arranged that, when the first sighting means is aligned with a selected problem printed on the margin of the base, said apertures will register with the corresponding known and unknown elements of the selected problem and with the answer to the selected problem.

3. The calculator of claim 2 wherein the known and unknown elements printed on the central portion of the base are printed in different colors to distinguish one from the other.

4. The calculator of claim 2 wherein the rotary member is printed with a triangle and each said element aperture is located on or adjacent the corresponding side or angle of the printed triangle.

5. A calculator comprising:
a base and a rotary member mounted to rotate on said base,
said rotary member covering a portion of the base and leaving uncovered a marginal portion thereof outside the perimeter of said rotary member,
said marginal portion of the base being divided into large segments each bearing indicia representative of a particular unknown element of trigonometric or geometric problems,
each large segment being further divided into small segments each bearing indicia representative of known quantities of a trigonometric or geometric problem,
all said large and small segments being visible in all positions of said rotary member,
the covered portion of said base bearing answers to said problem,
each answer depicting the manner of determining the unknown element indicated in one of the said large segments by applying the known quantities represented in one of said small segments embraced thereby,
said rotary member having a first sighting means for alignment with any selected small marginal segment and with the indicia thereon,
said rotary member being also formed with a second sighting means in the form of an aperture for revealing the answer on the covered portion of the base corresponding to the selected problem.

6. A trigonometric calculator comprising:
a base and a rotary member mounted to rotate on said base and to cover the central portion of said base,
said base being printed on its central portion with known elements of various trigonometric problems in a distinctive color, unknown elements of each of said problems in another distinctive color and the answers to each of said problems,
said answers being located on a circle and said known and unknown elements being located on a plurality of circles,
indicia representative of a particular side or angle problem element being located on a separate one of said plurality of circles,
all of said circles being concentric to the rotary axis of said rotary member,
said rotary member being formed with an answer aperture rotating on the answer circle and with a plurality of element apertures rotating on said plurality of circles,
said apertures permitting exposure of printed matter on the central portion of said base,
said rotary member being imprinted with a triangle and each of said element apertures is located on or adjacent to a side or an angle of said triangle to which it corresponds,
said answer aperture, element apertures and printed matter being so arranged that when the known and unknown elements of a trigonometric problem are revealed in said element apertures in appropriate distinctive color the manner of applying the unknown elements to determine the known element will be revealed in said answer aperture.

7. A trigonometric calculator comprising:
a base and a rotary member mounted to rotate on said base,
said rotary member covering a portion of said base and leaving uncovered a marginal portion thereof outside the perimeter of said rotary member,
said marginal portion being divided into large segments each bearing indicia representative of a particular unknown element of trigonometric problems,
each large segment being further divided into small segments each bearing indicia representative of known quantities of a trigonometric problem,
all said large and small segments being visible in all positions of said rotary member,
said base being printed on its central portion with known elements of various trigonometric problems in a distinctive color, unknown elements of each of said problems in another distinctive color and the answers to each of said problems,
said answers being located on a circle and said known and unknown elements being located on a plurality of circles,
indicia representative of each side or angle element being on a separate circle,
all of said circles being concentric to the rotary axis of said rotary member,
said rotary member being formed with an answer aperture rotating on the answer circle and with a plurality of element apertures rotating on said plurality of circles,
said apertures permitting exposure of printer matter on the central portion of said base,
said rotary member being imprinted with a triangle and each of said element apertures corresponds to a side or an angle of said triangle,
said rotary member having a first sighting means for alignment with a selected small marginal segment and with the indicia thereon, said sighting means, segments, answer aperture, element apertures and printed matter being so arranged that when the said sighting means is aligned with a small segment indicating the known elements in connection with the unknown element represented by the large segment the known and unknown elements of the trigonometric problem are revealed in said element apertures in appropriate distinctive color and in appropriate location according to the side or angle of a triangle represented thereby and the manner of applying said unknown elements to determine said known element is revealed in said answer aperture.

References Cited in the file of this patent

UNITED STATES PATENTS

| | | |
|---|---|---|
| 814,488 | Watson | Mar. 6, 1906 |
| 1,536,693 | Schneider | May 5, 1925 |
| 2,234,896 | De Turk | Mar. 11, 1941 |
| 2,521,930 | McPartlin | Sept. 12, 1950 |